W. LEVIN.
ORANGE CLIPPER.
APPLICATION FILED APR. 17, 1908.
912,248.
Patented Feb. 9, 1909.
Fig. 1.
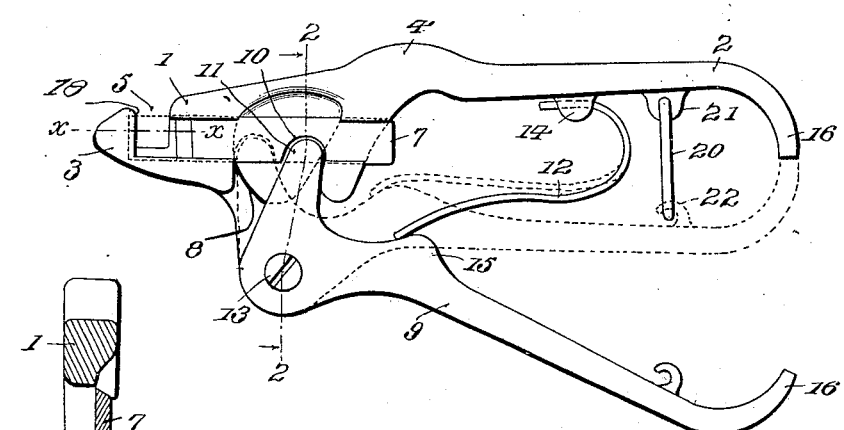
Fig. 2.
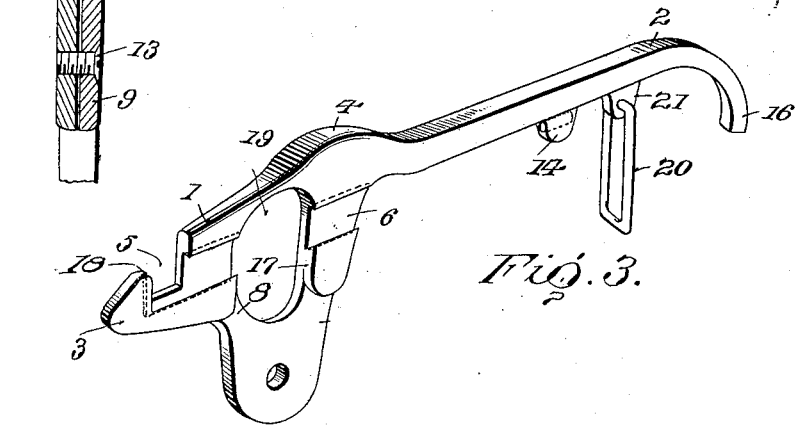
Fig. 3.
Fig. 4.
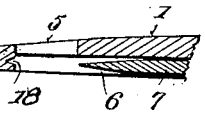
Witnesses
Inventor
W. Levin
By ___, Attorneys

UNITED STATES PATENT OFFICE.

WILLIAM LEVIN, OF REDLANDS, CALIFORNIA, ASSIGNOR TO MARIANNE LEVIN, OF REDLANDS, CALIFORNIA.

ORANGE-CLIPPER.

No. 912,248.　　　　Specification of Letters Patent.　　　　Patented Feb. 9, 1909.

Application filed April 17, 1908. Serial No. 427,648.

*To all whom it may concern:*

Be it known that I, WILLIAM LEVIN, citizen of the United States, residing at Redlands, in the county of San Bernardino and State of California, have invented certain new and useful Improvements in Orange-Clippers, of which the following is a specification.

The present invention provides an implement particularly designed for removing fruit, such as oranges, from trees, and which will enable the stem being cut short or close to the fruit without injuring the latter, and which at the same time will enable the operation to be easily and quickly performed.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a side view of a clipper embodying the invention. Fig. 2 is a cross section on the line *x—x* of Fig. 1, looking in the direction of the arrows. Fig. 3 is a perspective view of the body member, the cutter and operating member being removed. Fig. 4 is a sectional detail view on the line *x—x* of Fig. 1.

Corresponding and like parts are referred to in the following description and indicated in all the views of the drawings by the same reference characters.

The implement comprises two members, a cutter and a spring for holding the members in a given position. To distinguish the members, one is designated as the body member and the other as the operating member, the two members being pivotally connected and the spring serving to hold their handle portions separated so that upon pressing said handle portions together by closing the hand, the cutter is advanced to sever the stem.

The body member comprises a body portion 1 having a handle 2, an extension 3 and stop or finger rest 4. The extension 3 is tapered to readily penetrate the branches and leaves when placing the implement in position. A notch 5 is provided in a side of the extension 3 and receives the stem to be cut. A longitudinal channel 6 is provided in a side of the body portion 1 and forms a seat in which the cutter 7 is mounted. The channel or seat 6 intersects or leads into the notch 5, thereby admitting of the cutter 7 operating across said notch so as to sever the stem when the implement is in use. A recess 8 is provided in the side of the body portion 1 having the channel or seat 6 and opens into the latter and is adapted to receive the pivot end of the operating member 9.

The cutter 7 consists of a plate of uniform width and thickness and is mounted in the channel or seat 6 to reciprocate therein. Any means may be provided to prevent displacement of the cutter, and as shown, opposite sides of the channel or seat 6 are undercut and the longitudinal edges of the cutter are beveled to fit the undercut edges of said channel, thereby preventing lateral displacement of the cutter.

A notch 10 is provided in an edge of the cutter 7 and receives a nose 11 of the operating member 9. When the handle of the operating member 9 is pressed inward, the cutter is shot forward across the notch 5 and cuts the stem previously received therein. Upon relaxing the grip upon the handles of the operating members, the spring 12 reacts and presses the handles apart, thereby withdrawing or returning the cutter to normal position.

The operating member 9 is provided with a handle similar to the handle 2 and is widened and flattened at its pivot end to fit the recess 8 and is connected to the body portion 1 by means of a pivot fastening 13. The nose 11 forming a part of the member 9, enters the notch 10 of the cutter so that in the oscillatory movements of the operating member 9, the cutter 7 is reciprocated.

The spring 12 is secured at one end to one of the handles and engages the opposite member and serves normally to press the handle portions of the members apart and hold the cutter retracted. As shown, the spring 12 is secured to a lug 14 formed with the handle 2 and its opposite end engages a hump 15 at the inner end of the handle of the opposite member. The closing of the members is limited by the inner bent ends 16 of the handle portions, which come together as indicated by the full and dotted lines in Fig. 1. The opening of the handles is determined by the nose 11 engaging a shoulder 17 at the inner side of the recessed portion 8. The longitudinal channel 6 terminates at the outer wall of the notch 5 and said wall is formed with a groove 18 to receive the edge of the cutter 7 and thereby prevent dulling of the same. In operation, the groove 18 becomes filled with woody matter which prevents injury to the edge of the cutter and yet admits of said cutter operating effectively in the severing of the stems.

For the sake of lightness, as also to provide a clearance for obstructing matter, the body portion 1 is provided with an opening 19 which extends therethrough from the channel or seat 6.

To hold the handle portions of the members closed, a link 20 is provided and is connected at one end to a lug 21 formed with the handle 2 and is adapted to engage at its opposite end with a hook 22 formed upon the inner side of the handle of the operating member 9.

Having thus described the invention, what is claimed as new is:

1. An implement of the character described, comprising a body portion having a tapered extension at one end formed in an edge with a notch and having a handle projected in an opposite direction from the aforesaid extension, said body portion having a longitudinal channel in one side leading into the notch of the extension, a cutter mounted in said longitudinal channel, and a spring actuated operating member pivoted to the aforesaid body portion and having a projecting nose adapted to engage with said cutter to effect a reciprocating movement thereof 2. An implement of the character specified, comprising a body portion having a tapered extension formed in an edge with a notch and provided with a handle and having a longitudinal channel, and a recess in communication with said channel, a cutter mounted to reciprocate in said longitudinal channel to operate across the notch of the aforesaid tapered extension, and a spring actuated operating member having one end flattened and pivoted to the recessed portion of the aforementioned body portion and having a nose in engagement with said cutter to effect a reciprocating movement thereof.

3. An implement of the character specified, comprising a body portion having a tapered extension at one end formed in an edge with a notch and having a handle at its opposite end, and having a stop at the base of said handle, and having a longitudinal channel in one side leading into the said notch and formed with a recess at one side of the longitudinal channel and in communication therewith, a cutter mounted to reciprocate in said longitudinal channel and having opposite edges beveled to fit correspondingly undercut walls of the longitudinal channel, said cutter having a notch in an edge, an operating member having a flattened end pivoted to the recessed part of the aforementioned body portion and having a nose fitted in the notch of the cutter, and a spring arranged between the handle portions of the members and serving to normally hold them apart.

In testimony whereof I affix my signature in presence of two witnesses.

WILLIAM LEVIN. [L. S.]

Witnesses:
M. M. LOUGHLIN,
MARJORIE KNECHT.